US007875187B2

(12) United States Patent
Snezhko et al.

(10) Patent No.: US 7,875,187 B2
(45) Date of Patent: Jan. 25, 2011

(54) SYSTEMS AND METHODS FOR CREATION OF CONDUCTING NETWORKS OF MAGNETIC PARTICLES THROUGH DYNAMIC SELF-ASSEMBLY PROCESS

(75) Inventors: Oleksiy Snezhko, Woodridge, IL (US); Igor Aronson, Darien, IL (US); Wai-Kwong Kwok, Downers Grove, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 1071 days.

(21) Appl. No.: 11/641,337

(22) Filed: Dec. 19, 2006

(65) Prior Publication Data

US 2007/0215478 A1 Sep. 20, 2007

Related U.S. Application Data

(60) Provisional application No. 60/783,436, filed on Mar. 17, 2006.

(51) Int. Cl.
*B01D 35/06* (2006.01)

(52) U.S. Cl. ........................ 210/695; 210/222; 204/660

(58) Field of Classification Search ................. 210/222, 210/695; 204/660; 252/62.55; 264/427
See application file for complete search history.

(56) References Cited

U.S. PATENT DOCUMENTS

2006/0197052 A1* 9/2006 Pugel ...................... 252/62.55

OTHER PUBLICATIONS

Snezhko, A. et al., "Surface Wave Assisted Self-Assembly for Multidomain Magnetic Structures," Physical Review Letters, PRL 96, 078701 (2006).

Snezhko, A. et al., "Dynamic Self-Assembly of Magnetic Particles on the Fluid Interface: Surface-Wave-Mediated Effective Magnetic Exchange," Physical Review, E 73, 041306 (2006).

Snezhko, A. et al., "Structure Formation in Electromagnetically Driven Granular Media," Physical Review Letters, PRL 94, 108002 (2005).

* cited by examiner

*Primary Examiner*—David A Reifsnyder
(74) *Attorney, Agent, or Firm*—Foley & Lardner LLP

(57) ABSTRACT

Self-assembly of magnetic microparticles in AC magnetic fields. Excitation of the system by an AC magnetic field provides a variety of patterns that can be controlled by adjusting the frequency and the amplitude of the field. At low particle densities the low-frequency magnetic excitation favors cluster phase formation, while high frequency excitation favors chains and netlike structures. For denser configurations, an abrupt transition to the network phase was obtained.

20 Claims, 5 Drawing Sheets

SYSTEMS AND METHODS FOR CREATION OF CONDUCTING NETWORKS OF MAGNETIC PARTICLES THROUGH DYNAMIC SELF-ASSEMBLY PROCESS

CROSS REFERENCE TO RELATED APPLICATIONS

This application claims priority from U.S. Provisional Patent Application 60/783,436 filed Mar. 17, 2006, herein incorporated by reference in its entirety.

The United States Government has certain rights in this invention pursuant to Grant No. W-31-109-ENG-38 between the United States Department of Energy and The University of Chicago representing Argonne National Laboratories.

BACKGROUND OF THE INVENTION

The invention relates to a method of creating networks of magnetic particles on the surface of a solid or a fluid. More specifically the invention relates to a method of creating self-assembling networks of conducting chains of magnetic particles.

The use of granular materials has become integral for many aspects of modern life. Granular particles do not cleanly fit within the definition of a solid, a liquid or a gas. Granular particles exhibit no tensile stresses as a solid would, have inelastic collisions unlike a gas, and have no critical slope as exhibited by liquids. In particular, the size of the granular particle impacts the properties it exhibits. The trend in materials science has been to seek manipulation of smaller and smaller granular particles.

As microscale and nanoscale particles are finding important applications, there is a need for an ability to control extremely fine powders which are not easily controlled by mechanical methods.

SUMMARY OF THE INVENTION

One embodiment of the invention relates to creation of self-assembled conducting networks of micro and nanoparticles. Manipulation of magnetic micro and nano-particles enables creation of self-assembled conductive networks for micro- and nano-device technology.

The present invention allows for the ability to control extremely fine powders which are not easily controlled by mechanical methods, such as microscale and nanoscale particles. In one embodiment, the present invention controls the ratio between long-range electromagnetic forces and short-range collisions by changing the amplitude and frequency of the applied electromagnetic field. In one aspect of the present invention, a first order phase transition from finite length chains of particles to infinite networks occurs as the driving parameters are varied.

These and other objects, advantages, and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

The present invention relates to the dynamic self-assembly of magnetic particles. The self-assembly results in a conducting networks of the magnetic particles. The networks of the present invention can be assembled on either a solid surface or on the surface of a liquid.

In one embodiment, network generation of the particles through the dynamic self-assembly process of the present invention occurs on a solid surface. In general, the magnetic particles 101 are placed in a cell 105.

Figure 1:
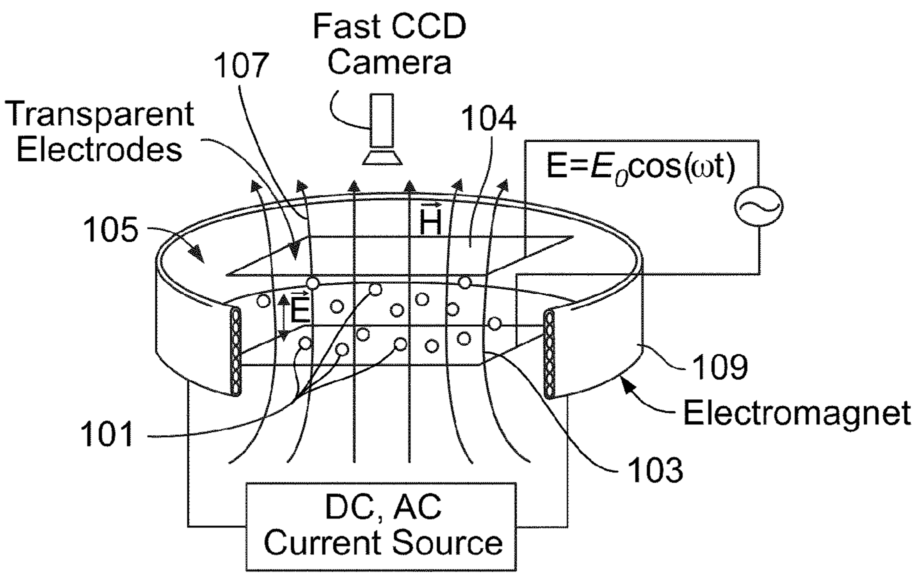
FIG. 1 is an illustration of one embodiment of the present invention for securing a network of particles on a solid.

FIG. 1 illustrates one embodiment of a setup in accordance with the principles of the present invention for generating a network on a solid surface. Magnetic particles 101 are placed in a cell 105 for self-assembly. In one embodiment, the cell 105 is located between a lower plate 103 and an upper plate 104. An external magnetic field 107 is provided by a magnet, such as an electromagnet 109, which is placed around the cell 105. In a preferred embodiment, the electromagnet 109 is positioned equidistant with respect to the upper plate 104 and the lower plate 103, forming a plane passing through the cell 105. Once magnetic particles are positioned in the cell 105, they can be magnetically driven.

Figure 2:
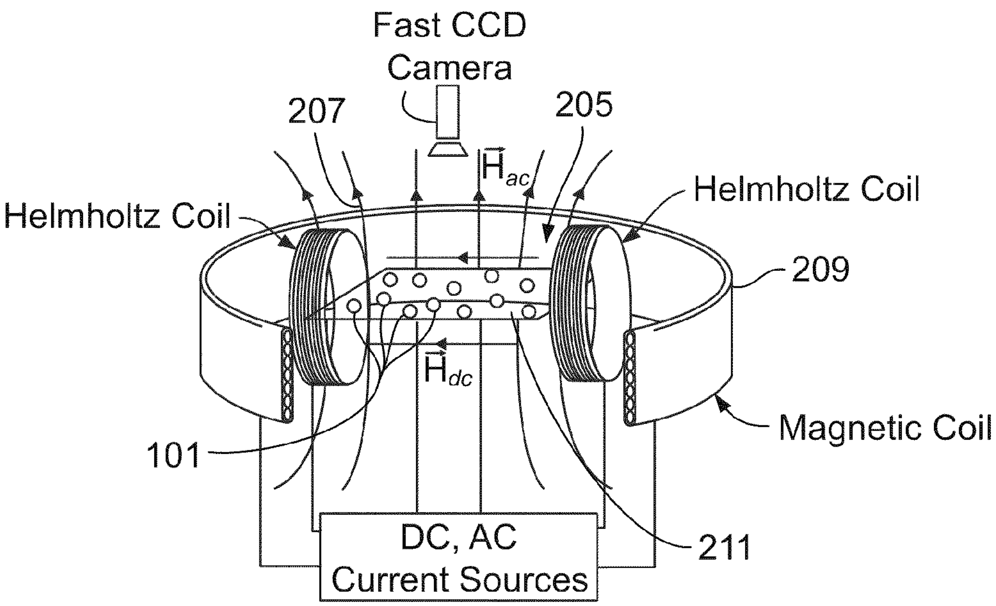
FIG. 2 is an illustration of one embodiment of the present invention for securing the network on a surface of a liquid.
Figure 4:
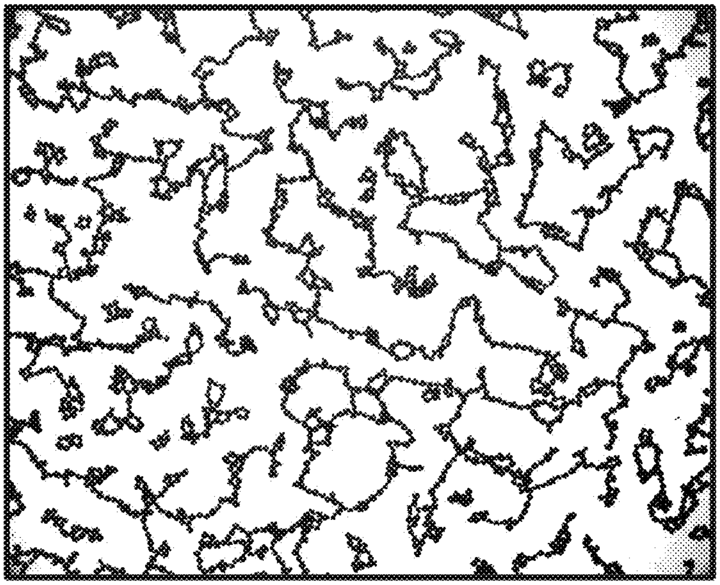
FIG. 4 is an illustration of a network generated on the liquid/air interface out of 45 μm nickel spherical particles in an AC magnetic field.

In another embodiment, the network generation can occur on the surface of a liquid as illustrated in FIG. 2. The preferred setup for liquid is similar to that described for a solid, with a cell 205 surrounded by a electromagnet 209 generating a magnetic field 207. The particles 101 are positioned in a liquid layer 211. In order to create a network, proper amplitude and the frequency range of the external magnetic field shall be selected. After the network is created it can be fixed by a solidification of the solution. The process is easily scalable to sub-micron sizes. In FIG. 4 network generated out of 45 μm Nickel spherical particles at the water/air interface is shown.

Pure magnetic driving is accomplished as follows. Magnetic particles with moment, M, being subjected to an external magnetic field H experience a torque $-[M \times H]$. This torque forces the magnetic particles magnetic moment (M) to be aligned with the applied magnetic field. This rotation of the magnetic moment can be done in at least two ways: (i) the magnetic moment itself can rotate inside the particle 101—against the internal magnetic anisotropy field, or (ii) the whole particle 101 can rotate, thus keeping the moment (M) aligned with the internal magnetic anisotropy field and aligning the internal field and the magnetic moment (M) with the applied magnetic field. In the latter case, the particle 101 needs to overcome the resistance from the friction and adhesion forces between the particle and the surface of the plate. As the magnitude of the external magnetic field exceeds some critical value (related to the resistance forces exhibited on the particle), particles 101 begin to rotate by keeping their moment aligned with the field and to move by being driven by the magnetic drag force $F_m=\nabla(MH_{local})$, where $H_{local}$ designates the local magnetic field coming from dipolar fields of the neighboring particles 101 and the external magnetic field.

Figures 5A, 5B, 5C:
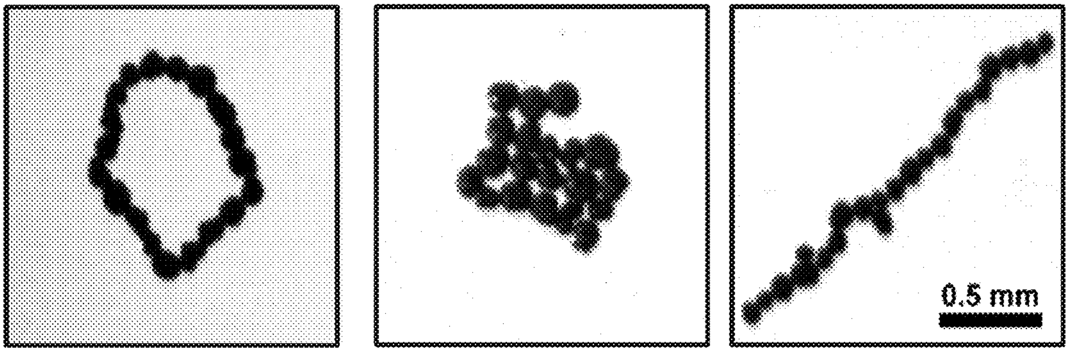
FIGS. 5*a-c* are photographs of structures formed in an external AC magnetic field: rings (5*a*), compact clusters (5*b*), and chains of dipoles (5*c*).

In one exemplary illustration of the present invention, pure AC magnetic driving is achieved placing the magnetic particles into a cell filled with toluene to dampen the kinetic energy in the system. Before the particles 101 are driven, the cell contents of toluene and the magnetic particles was pushed to a gas-like state with an alternating current AC electric field in a zero magnetic field to create a uniform distribution of particles. Subsequently, the electric field was turned off and the system was subjected to the 15 Oe AC magnetic field. FIGS. 5*a-c* demonstrate some selected structures generated by this embodiment of the invention. The controllable generation of specific structure such as these is further described below.

Since the local arrangement is dominated by a highly anisotropic dipole-dipole magnetic interaction (a dipole field generated by a particle at a distance comparable to its diameter exceeds 200 Oe), the head-to-tail interaction is the strongest, favoring formation of the quasi-one-dimensional chain structures. Chains can also form a compact structure, such as a cluster of dipoles. Such dipole clusters can nucleate in the situation when two neighboring parallel chains have opposite polarization and attract each other to form a cluster.

One can vary the frequency of an AC magnetic field to control the time it takes the particle 101 (or chain segment) to rotate to keep its moment aligned with the local field and move along the local field gradient. There are two characteristic times: one associated with the magnetization of magnetic particles and related to domain walls movement (approximately $7\times10^{-4}$ s for nickel particles), and the other related to the mechanical response of the system determined roughly by $\sqrt{I/(MH_0)}$ where I stands for the moment of particle inertia, and $H_0$ and M designate the amplitude of the external magnetic field and magnetic moment of the particle (approximately $4\times10^{-3}$ s for nickel particles). Thus, control of the frequency allows for selective control of the particle assembly. If the frequency is too high (for example, for nickel spherical particles above 200 Hz in one embodiment) the particles do not have a period of time in which they can align since the mechanical response time is higher than the period of AC magnetic field. By decreasing the frequency, a short period of time exists for the particles to react and they are able to react to the external AC magnetic field to form short chains. A further decrease of the frequency leads to a longer time to react and to the creation of more energetically favorable configurations, such as rings and branched chains.

Figure 3:
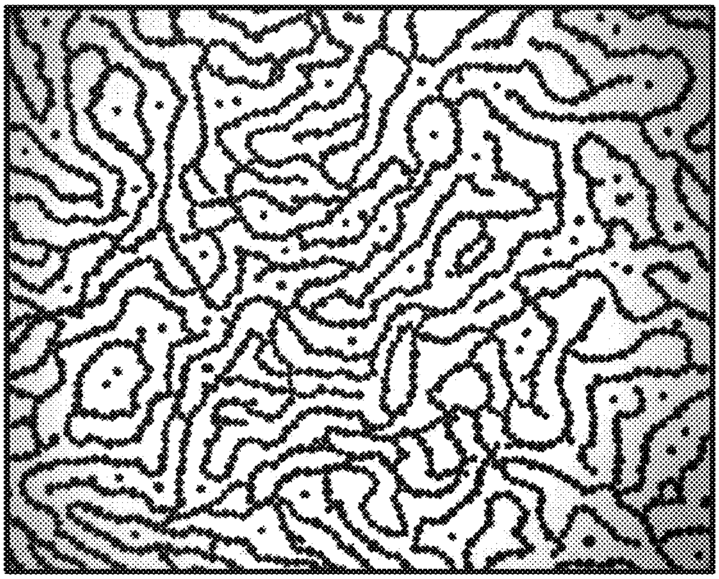
FIG. 3 is an illustration of a network generated on the solid interface out of 90 μm nickel spherical particles in an alternating current (AC) magnetic field.

The shape of the conducting network of magnetic particles can be controlled by changing the frequency of the AC magnetic field. For example, low-frequency excitations (0-30 Hz) produce a clustered phase; high-frequencies (80-200 Hz) assemble wire-like short chains, while intermediate-frequencies favor netlike patterns. At low particle densities the low-frequency magnetic excitation favors cluster phase formation, while high frequency excitation favors chains and netlike structures (see FIG. 3) For denser configurations, an abrupt transition to the network phase was observed. (see FIG. 7*b*).

Figures 6A, 6B, 6C:
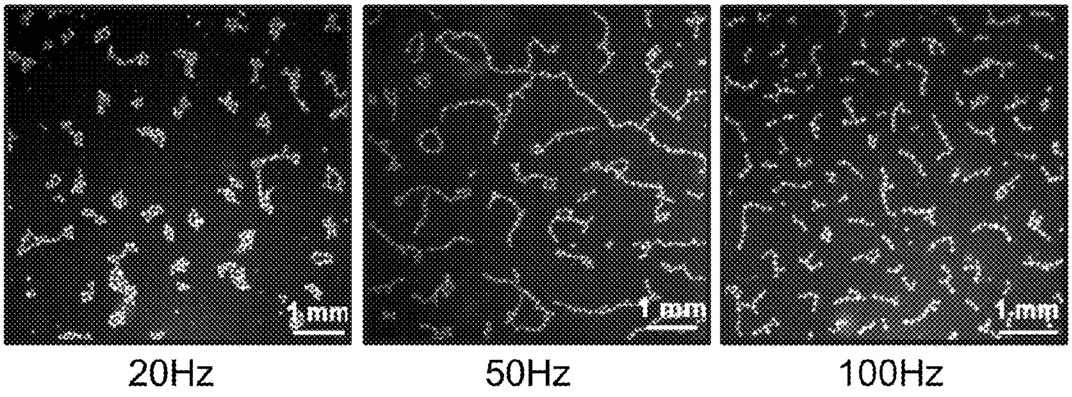
FIGS. 6*a-c* are photographs of patterns formed in accordance with the principles of the present invention using nickel spheres (5.3% of the surface monolayer coverage) under magnetic driving at 20 Hz forming a clustered phase (6*a*), 50 Hz forming a netlike structure (6*b*), and 100 Hz forming a chain structure (6*c*)

In one embodiment, the compact clusters shown in FIGS. 6*a*-6*c* are initiated by decreasing the frequency of an AC magnetic field. FIGS. 6*a*-6*c* show various patterns formed at the AC magnetic field of 20 Hz, 50 Hz, and 100 Hz in the cell with a 5.3% surface coverage of nickel particles.

Illustrations of Exemplary Embodiments of the Present Invention

In one exemplary illustration of the present invention, a cell is setup as shown in FIG. 1. Conductive particles are placed between two horizontal transparent conducting glass plates (12×12 cm with a spacing of 1.5 mm). An external magnetic field is provided by a set of magnetic coils (30 cm in diameter) placed around the cell. To excite the granular media, a voltage of 0-2 kV with a frequency of 0-150 Hz is applied to the plates or the granular media is subject to AC magnetic field in the range 0-15 Oe with a frequency 0-300 Hz. This setup is capable of independently creating a direct current (DC) magnetic field in the range 0-80 Oe and an AC field in the range 0-15 Oe with the frequency 0-300 Hz (for magnetic driving). Spherical nickel particles with an average size of about 90 μm were used. The magnetic moment per particle at the 80 Oe field is $1\times10^{-5}$ emu; the saturated magnetic moment is $2\times10^{-4}$ emu per particle; the saturation field is about 4 kG; the magnetic moment relaxation time is about $7\times10^{-4}$ s. The number of particles was varied in the range 120,000-300,000. Experiments were also performed with 40 μm sized particles, but no qualitative difference was found. The experiments were performed in air and in nonpolar liquid (toluene).

Each experiment was started from a randomly dispersed configuration of particles over the bottom plate. Then an AC magnetic field was applied to the cell (no electric field). Clearly, the pattern is determined by the frequency of the AC magnetic field: low-frequency excitations (0-30 Hz) produce a clustered phase; high-frequencies (80-200 Hz) assemble short chains, while intermediate-frequencies favor netlike patterns. The resulting patterns are strongly history dependent. For example, a continuous decrease of the magnetic field frequency from 200 to 10 Hz results in the formation of a netlike structure, in contrast to the formation of clusters obtained by the "relaxation" at the constant frequency of 10 Hz. Denser configurations (Ø=1.115 and 0.133), however, do not exhibit the cluster phase. Instead, a phase transition to the network phase (infinitely long multibranch chains) is observed at low frequencies.

Figure 7A:
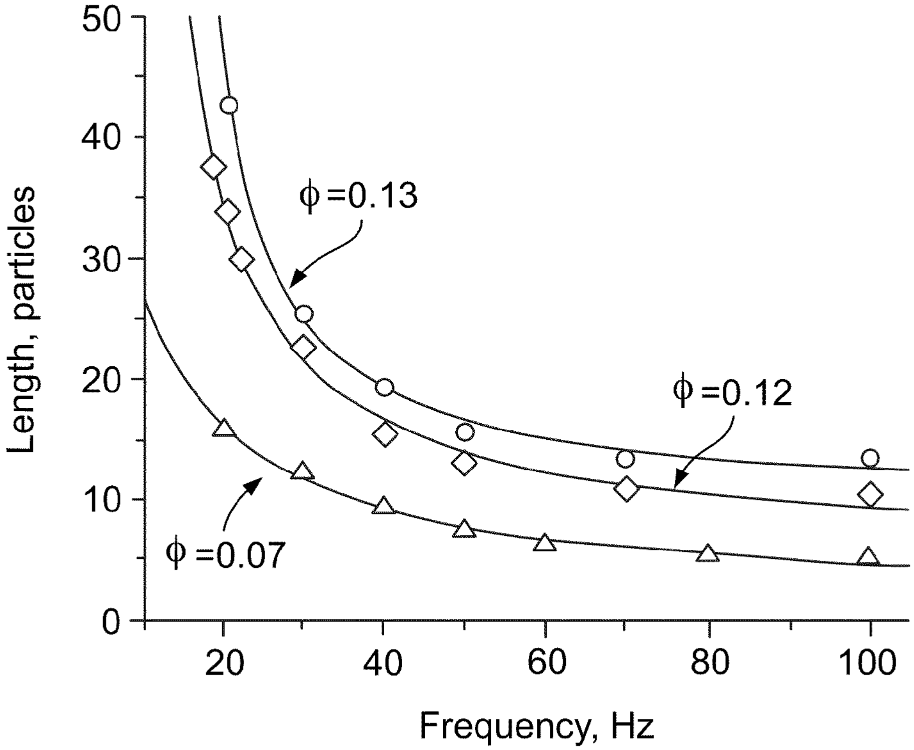
FIG. 7*a* is a graph of the saturated chain length vs frequency of applied 15 Oe AC magnetic field for different amounts of nickel 90 μm particles in the cell, the inset, FIG. 7*b* showing the saturated chain length vs applied AC (100 Hz) electric voltage applitude for a magnetic driven system ($H_{max}$=15 Oe; f=25 Hz; $\Phi \approx 0.10$)
Figure 7B:
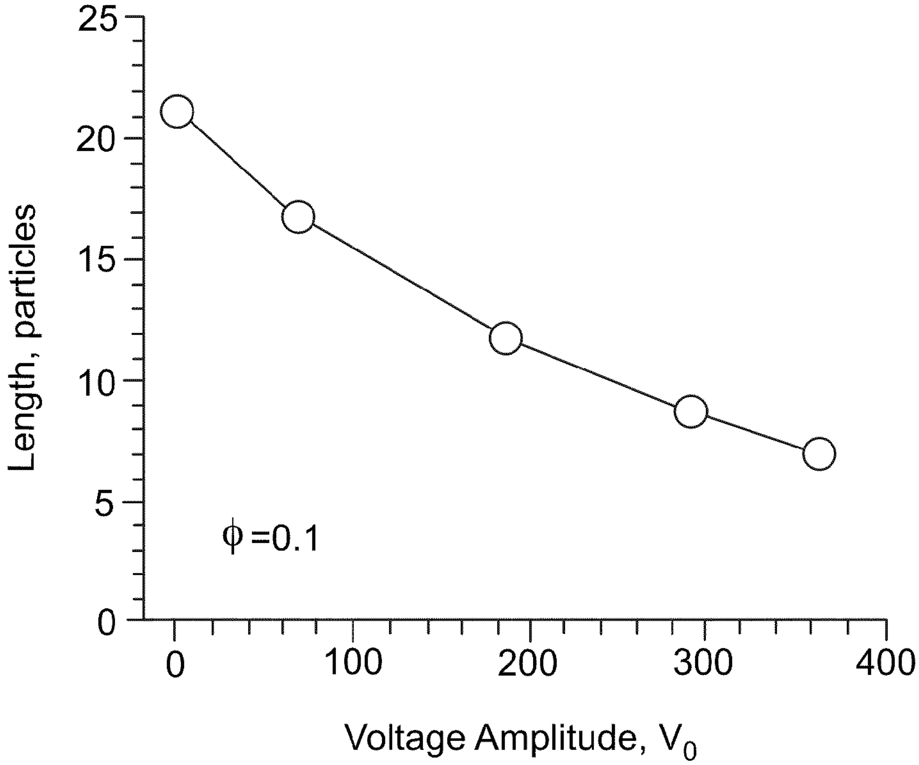

To analyze the phase transition, an average chain length as a function of the AC magnetic field frequency is plotted in FIG. 7*a* for different densities. (Insert graph 7*b* showing the saturated chain length vs applied AC (100 Hz) electric voltage applitude for a magnetic driven system ($H_{max}$=15 Oe; f=25 Hz; $\Phi\approx0.10$). Data were taken after the system was left to "relax" in the applied field for about 10 min to attain their respective equilibrium state. As the frequency of the magnetic field decreases, the average length of the chains tends to diverge for dense configurations (Ø=0.115 and 0.133) and saturates for less dense ones. The solid lines in the figure are fits to the expressions $A+B/(x-f_0)$, where $f_0$ designates a critical frequency when the system undergoes a phase transition to the netlike phase. The critical frequencies extracted from the fits are 14.10 and 6.11 Hz for Ø=0.133 and Ø=0.115, respectively. The critical frequency for the surface coverage of Ø=0.07 resulted in a negative value, $f_0$=−5.62 Hz, indicating that there is no transition to the network phase. Indeed, for such low density configurations, compact clusters were observed at low frequencies.

Figure 8:
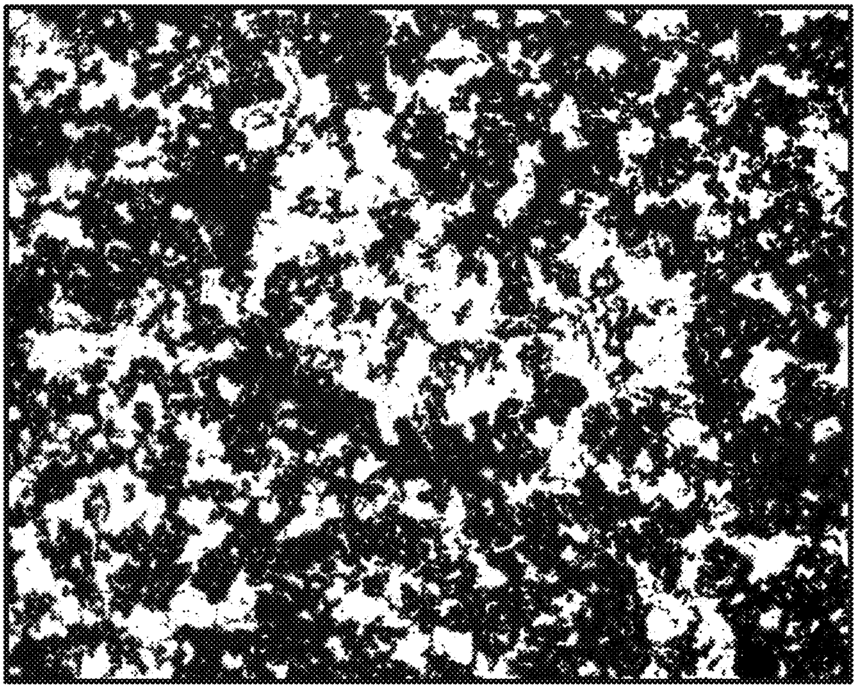
FIG. 8 are photographs of nickel ink particles with no structuring present (20× magnification)
Figure 9:
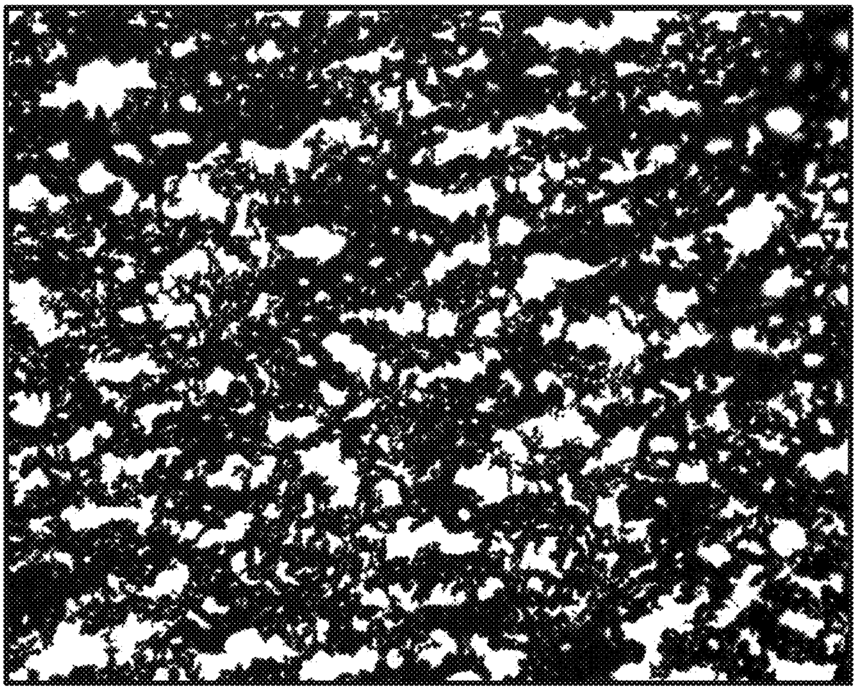
FIG. 9 illustrates nickel ink particles after undergoing dynamic self-assembly of the present invention (20× magnification).

In a second illustration of the present invention, a conductive ink was prepared using 3 micron nickel particles. FIG. 8 illustrates the particles prior to application of the present invention, i.e. no structuring is present (20× magnification). FIG. 9 illustrates the particles after undergoing the methods of the present invention as previously described. Dynamic self-assembly is shown in FIG. 9. As proof of the self-assembly, the structures in FIGS. 8 and 9 were tested for resistivity. The difference in resistivity between the two films was significant. The unstructured film of FIG. 8 exhibited about 24.8 MOhms of resistence, while the structured film of the present invention shown in FIG. 9 only exhibited 13 kOhms, a 1500 times difference.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. One of ordinary skill in the art will appreciate that the present invention encompasses a multitude of applications, for example the significant improvement of the electro-conductive properties of conductive inks widely used in industry for contact printing. The embodiments were chosen and described in order to explain the principles of the present invention and its practical application to enable one skilled in the art to utilize the present invention in various embodiments, and with various modifications, as are suited to the particular use contemplated.

We claim:

1. An apparatus for assembly of a conducting network of magnetic particles comprising:
- a cell;
- a magnet placed around the cell, the magnet configured to produce an AC magnetic field perpendicular to the cell;
- wherein the magnetic particles assemble into a conducting network in the presence of the AC magnetic field.

2. The apparatus of claim 1, wherein the cell is positioned between an upper plate and a lower plate.

3. The apparatus of claim 2, wherein the magnetic field is perpendicular to the lower plate.

4. The apparatus of claim 1, wherein the cell is filled with a fluid.

5. The apparatus of claim 4, wherein the magnetic field is perpendicular to an upper surface of the fluid.

6. The apparatus of claim 1, wherein the magnet is an electromagnet.

7. The apparatus of claim 1, wherein the frequency of the magnetic field is a low frequency and the apparatus is configured to produce clusters of magnetic particles.

8. The apparatus of claim 1, wherein the frequency of the magnetic field is an intermediate frequency and the apparatus is configured to produce netlike patterns of magnetic particles.

9. The apparatus of claim 1, wherein the frequency of the magnetic field is high frequency and the apparatus is configured to produce chains of magnetic particles.

10. An apparatus for creation of a conducting network of magnetic particles comprising:
- a lower plate and an upper plate, the lower and the upper plates forming a cell therebetween; and
- a magnet placed around the periphery of the cell, the magnet configured to produce an AC magnetic field external to both the upper plate and the lower plate;
- wherein magnetic particles placed in the cell between the lower plate and the upper plate undergo self-assembly upon magnetic driving.

11. The apparatus of claim 10, wherein the magnet is an electromagnet.

12. The apparatus of claim 10, wherein the frequency of the AC magnetic field is a low frequency and the apparatus is configured to produce clusters of magnetic particles.

13. The apparatus of claim 12, wherein the frequency is from 0 to about 30 Hz.

14. The apparatus of claim 10, wherein the frequency of the AC magnetic field is an intermediate frequency and the apparatus is configured to produce netlike patterns of magnetic particles.

15. The apparatus of claim 14, wherein the frequency is from 30 to about 80 Hz.

16. The apparatus of claim 10, wherein the frequency of the AC magnetic field is a high frequency and the apparatus is configured to produce chains of magnetic particles.

17. The apparatus of claim 16, wherein the frequency is from about 80 to about 200 Hz.

18. A method for forming a conducting network of magnetic particles on a liquid comprising:
- providing a cell comprising an upper plate and a lower plate and having a liquid layer for receiving the magnetic particles;
- providing a magnet disposed around the periphery of the cell;
- selecting a magnetic field frequency to be generated by the magnet;
- generating a magnetic field external to both the upper plate and the lower plate resulting from a voltage supplied to the magnet and characterized by the magnetic field frequency;
- driving the magnetic particles with the magnetic field to self-assemble the magnetic particles to form a conducting network,
- wherein the configuration of the conducting network is adjustable based on the magnetic field frequency.

19. The method of claim 18, wherein the magnetic field is substantially perpendicular to an upper surface of the liquid.

20. The method of claim 18, wherein the magnetic field frequency is selected from the group consisting of:
- a low frequency wherein the magnetic particles are driven to form a cluster configuration;
- an intermediate frequency wherein the magnetic particles are driven to form a netlike configuration; and
- a high frequency wherein the magnetic particles are driven to form a chain configuration.

* * * * *